United States Patent Office 3,034,886
Patented May 15, 1962

3,034,886
PROCESS FOR REFINING SILICON AND FERRO-SILICONS AND RESULTANT PRODUCTS
Emile Pruvot, Chambery, and Maurice Laparra and Paul Lugagne, Saint Julien de Maurienne, France, assignors to Societe Electrometallurgique de Montricher, Paris, France, a corporation of France
No Drawing. Filed Oct. 25, 1960, Ser. No. 64,726
Claims priority, application France Nov. 12, 1959
4 Claims. (Cl. 75—53)

The reduction of silicious minerals for the production of silicon or ferrosilicons always causes the introduction of impurities resulting from the partial, or total reduction, of the impurities contained in the ore or in the reducing agent employed, or from the combination of the reducing agent with the resultant metalloid.

These impurities are frequently harmful in the use of the resultant product and it is necessary to eliminate the same.

This can be attained by selecting exceptionally pure raw materials; however, this leads to a high first cost and does not always permit the elimination of the impurities to a degree sufficient to satisfy the requirements of the users.

Accordingly, research has been conducted to develop refining process for silicon and ferrosilicon.

There has been proposed a refining process which consists in the injection into the silicon or the ferrosilicon in the liquid state a current of chlorine, or of oxygen-containing gas by means of a refractory tube; a portion of the calcium and of aluminum is eliminated in this manner.

This treatment possesses the advantage of being simple; however, its effectiveness is limited and the harmful impurities are not eliminated to a sufficient degree. Moreover, the use of gaseous chlorine is inconvenient to the operating personnel and neighborhood, and the handling thereof is not easy.

The present invention, which is based on applicants' researches, has for its object the refining of silicon and of ferrosilicons by means of silicon fluoride or compounds capable of giving off silicon fluoride at the reaction temperature, which ranges between about 1300° and about 1600° C.

The substance containing silicon fluoride can be injected in the gaseous state, for example, by means of a refractory tube which dips into the liquid bath to be refined, or by means of nozzles (tuyeres) which are integral with the bottom of the ladle into which the metal or the liquid alloy has been poured.

It can likewise be injected in the form of a finely divided solid fluoride compound in suspension in a gas, or in the form of bricks immersed in the liquid product to be refined, or by any other known means.

In the case of silicon having a 98% silicon content and in the case of ferrosilicons, it is frequently necessary to eliminate the aluminum, calcium and the carbon, or at least one of these impurities, in such a way that their content by weight in the refined product does not exceed the following values:

| | Percent |
|---|---|
| Al | <0.10 |
| Ca | <0.05 |
| C | About 0.010 |

According to the present invention, the liquid bath is treated with silicon fluoride or with a substance which is adapted to give off that compound under the treating conditions.

In this way, almost the entire quantity of aluminum, alumina and calcium are eliminated in the form of aluminum and calcium fluorides and, simultaneously, the carbon content is substantially reduced.

A convenient and efficient way of operating with the silicon fluoride consists in using fluosilicic acid or a fluosilicate, either by injecting them as such in the midst of the silicon or ferrosilicon to be refined, or by preliminarily decomposing the fluosilicate by heat or an acid, and by injecting the gaseous silicon fluoride or the fluosilicic acid produced by such decomposition.

The fluorides of aluminum and of calcium resulting from the treatment form, if the temperature be high, a highly liquid slag which it is difficult to separate from the refined liquid product. It has been found that it is convenient to inject, at the same time as the fluoride compound, a refractory oxide, such as silica in the form of fine sand, which has a triple function: it facilitates the flow of the fluoride compound in the injection tube, it thickens the slag which is readily removed ("décrasse") and finally, it protects the refined bath against contamination by the atmosphere.

The process of the present invention is simple, quick and very effective; a particular advantage of said process is that it does not involve losses of the product to be refined, and losses—if any—are compensated by the addition of metal or metalloid in the form of a fluoride compound.

Example 1

Into a ton of liquid ferrosilicon having a 65% silicon content and containing 0.88% of calcium, there is injected by means of a graphite tube, 20 kg. of aluminum fluoride suspended in compressed air.

Following slag removal ("décrassage") and casting in a cast-iron ingot mold, only traces of calcium remain in the ferrosilicon.

Example 2

Into a ton of liquid ferrosilicon having a 65% silicon content and also containing

| | Percent |
|---|---|
| Al | 0.19 |
| Ca | 0.56 |
| C | 0.055 | there is injected, by means of a graphite tube, 20 kg. sodium fluosilicate suspended in compressed air.

The reaction produces energetic boiling, due to the decomposition of the fluosilicate of soda into silicon fluoride and sodium fluoride.

The resultant mixing is particularly advantageous for the effectiveness of the treatment.

Following slag removal and casting in a cast-iron ingot mold, the ferrosilicon merely contains

| | Percent |
|---|---|
| Al | 0.05 |
| Ca | Traces |
| C | 0.010 |

Not a trace of sodium was found in the treated ferrosilicon.

Example 3

Into a ton of liquid ferrosilicon having a 65% silicon content and containing

| | Percent |
|---|---|
| Al | 0.26 |
| Ca | 0.77 |
| C | 0.044 | there is injected, by means of a graphite tube, a mixture of 28 kg. sodium fluosilicate and 8 kg. very fine silicious sand suspended in compressed air.

Following slag removal and casting in a cast-iron ingot mold, the ferrosilicon only contains:

|    | Percent |
|----|---------|
| Al | 0.04 |
| Ca | 0.04 |
| C  | 0.010 |

In 22 runs involving about 30 tons of ferrosilicon with a 65% silicon content, the average silicon content changes from 66.64% before treatment to 67.30% after treatment.

This result shows that the loss of silicon by volatilization has at the very least been compensated by the addition of silicon from the sodium fluosilicate.

*Example 4*

Into a ton of liquid ferrosilicon of 75% silicon content containing

|    | Percent |
|----|---------|
| Al | 0.28 |
| Ca | 0.82 | there is injected, by means of a graphite tube, a mixture of 28 kg. of sodium fluosilicate and 8 kg. of very fine silicious sand in suspension in oxygen.

Following slag removal and casting in a cast-iron ingot mold, the ferrosilicon only contains

|    | Percent |
|----|---------|
| Al | 0.08 |
| Ca | 0.02 |

*Example 5*

*Refining of 98–99% silicon.*—Into casting ladles containing 600 kg. liquid silicon, there is injected, by means of a graphite tube, 15 kg. of sodium fluosilicate suspended in compressed air.

This operation was repeated with five ladles.

Before treatment, the silicon contained

|    | Percent |
|----|---------|
| Al | 0.25 |
| Ca | 0.20 |

Following slag removal and casting in a cast-iron ingot mold, the 3 tons of silicon merely contained

|    | Percent |
|----|---------|
| Al | 0.07 |
| Ca | 0.04 |

*Example 6*

*Refining 98–99% silicon heavily charged with impurities.*—Into casting ladles containing 600 kg. of liquid silicon, there is injected by means of a graphite tube 25 kg. of sodium fluosilicates suspended in oxygen.

This operation is repeated with four ladles.

Before treatment, the silicon contained on the average

|    | Percent |
|----|---------|
| Al | 1.06 |
| Ca | 1.40 |

Following slag removal and casting in a cast-iron ingot mold, the silicon thus treated merely contained.

|    | Percent |
|----|---------|
| Al | 0.12 |
| Ca | 0.11 |

This result shows the effectiveness of the process, despite the fact that the crude silicon had an exceptionally high content of impurities.

We claim:

1. Process for refining a material selected from the class consisting of silicon and ferrosilicons, comprising the steps: heating the material to bring the same into the liquid state, and injecting therein a substance chosen from the group consisting of silicon fluoride and compounds adapted to give off silicon fluoride at the temperature prevailing within the liquid material.

2. Process according to claim 1, wherein sodium fluosilicate is injected into the liquid material.

3. Process according to claim 1, wherein the refining treatment is carried out within the range of about 1300° to about 1600° C.

4. Process according to claim 2, wherein silica is injected with the sodium fluosilicate.

References Cited in the file of this patent

UNITED STATES PATENTS

| 279,947 | Henderson | June 26, 1883 |
| 1,098,346 | Goldmerstein | May 26, 1914 |
| 1,426,054 | Estabrooke et al. | Aug. 15, 1922 |
| 2,080,159 | Archer | May 11, 1937 |
| 2,866,701 | Strauss | Dec. 30, 1955 |
| 2,932,564 | Evans | Apr. 12, 1960 |
| 2,937,929 | Voos | May 24, 1960 |